Sept. 14, 1965   R. J. FAY   3,205,837
APPARATUS FOR PRODUCING EDIBLE DOUGH PRODUCTS
Filed Sept. 19, 1962   2 Sheets-Sheet 1
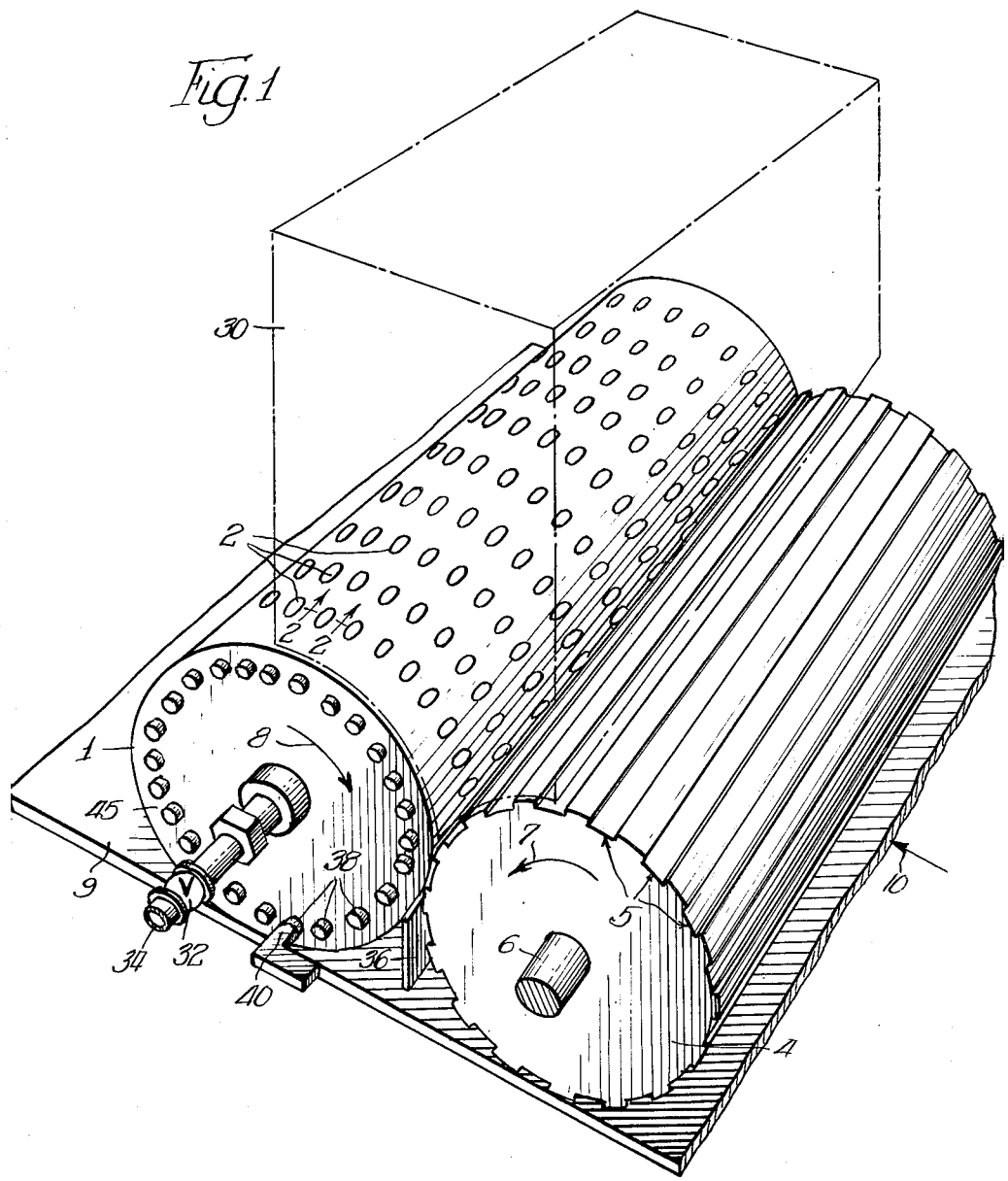
INVENTOR.
Rudolph J. Fay,
BY Sept. 14, 1965  R. J. FAY  3,205,837
APPARATUS FOR PRODUCING EDIBLE DOUGH PRODUCTS
Filed Sept. 19, 1962  2 Sheets-Sheet 2
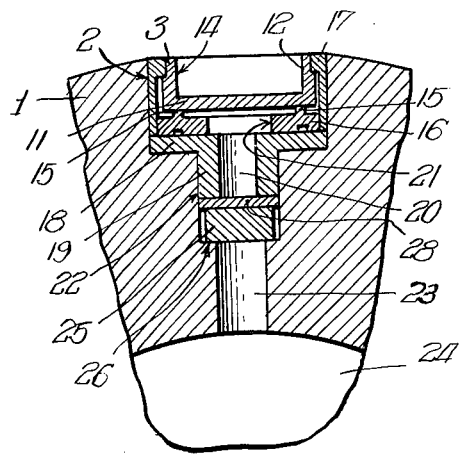
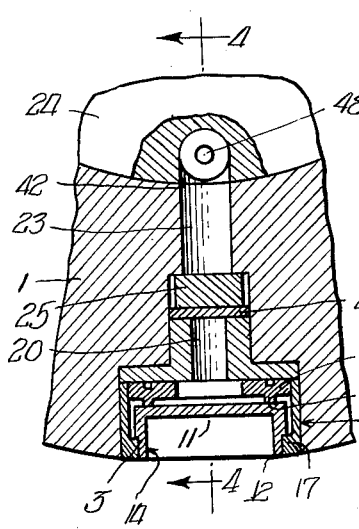
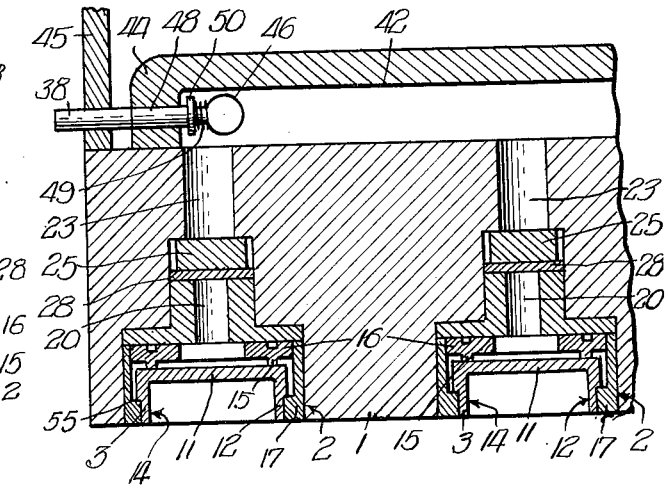
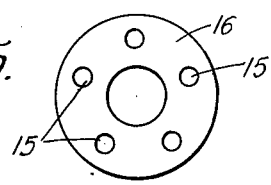
INVENTOR.
Rudolph J. Fay,
BY

United States Patent Office 3,205,837
Patented Sept. 14, 1965

3,205,837
APPARATUS FOR PRODUCING EDIBLE DOUGH PRODUCTS
Rudolph J. Fay, 259 S. Villa Ave., Villa Park, Ill.
Filed Sept. 19, 1962, Ser. No. 224,866
8 Claims. (Cl. 107—8)

This invention relates, in particular, to apparatus for producing edible dough products, such as cookies, or similar products, which are formed in die cavities, or the like.

In general, in apparatus of this character the dough is introduced into die cavities wherein the dough is brought generally to the desired form. The formed dough product is then expelled from the die cavity, and delivered, for example, to an oven wherein the formed dough article is baked.

In the past, considerable difficulty has been encountered is removal or ejection of the dough product from the die cavity, or the like. Sugar, dough and many other materials adhere or stick, for example, to the sides and bottom of the die cavity, and have presented a difficult problem of ejection or removal of the formed dough product from the die cavity, or the like.

Cookie dies formed of "Teflon," a tetrafluorethylene plastic to which materials will not readily adhere, with metal cores have been proposed, but it has been found that there is always objectionable adhesion because of the vacuum produced during extraction of a cookie from such a die.

The broad concept of the present invention resides in the provision of improved means for preventing adhesion or sticking of the dough product to the die and for expeditious ejection of the dough product from the die cavity.

More particularly, the present invention resides in the provision of a die having a porous wall defining a die cavity, means for introducing dough into the die cavity, and means for passing air, or other fluid having no deleterious effect or influence on the dough product, through the porous wall of the die while the dough is being introduced into the die cavity so as to create a film of air between the dough product and the die for preventing adhesion of the dough product to the die.

Another feature resides in the provision of means for passing air under higher pressure through the porous wall of the die to eject the formed and non-adhering product from the die cavity.

Another feature resides in provision of the porous wall dies about the periphery of a rotary die roll, passing the fluid under relatively low pressure through the porous walls of the dies from the interior of the die roll, and passing the fluid under higher pressure through the porous walls of the dies as they reach ejecting position to eject the formed products from the die cavities.

Another features resides in the provision of valve actuators about the end of the die roll and a cam cooperable therewith in proximity to ejecting position for passing the ejecting fluid under higher pressure through the porous walls of the dies to eject the formed products from the die cavities.

Further features and numerous advantages and adaptations of the invention will be apparent from the following detailed description taken in connection with the accompanying drawings, it being understood that the invention is limited only within the scope of the appended claims and not to the particular embodiment selected for illustration.

In the drawings:
FIGURE 1 is a fragmentary and more or less diagrammatic perspective of one form of dough product producing apparatus showing the present invention applied thereto;

FIGURE 2 is a fragmentary section view through the die roll and one of the die cavities and cookie dies taken along the line 2—2 of FIGURE 1;

FIGURE 3 is a fragmentary sectional view similar to FIGURE 2 but with the die cavity and cookie die in position for passage of air under higher pressure through the porous wall of the die to eject the formed and non-adhering product from the die cavity;

FIGURE 4 is a fragmentary and more or less diagrammatic sectional view taken along the line 4—4 of FIGURE 3;

FIGURE 5 is an outer plan view of one of the die supports showing the annularly spaced projections thereon.

Referring to the drawings, the apparatus selected for illustration is, for example, a combination rotary and wire cut machine.

The basic machines used in the manufacture of biscuits, crackers and the like are as follows:

(1) Wire Cut
(2) Rotary
(3) Bar
(4) Cutting Machine

The apparatus of my present invention will produce all of the above stated products of No. 1 and No. 2 and most of the products of No. 3 and No. 4. It will not only produce them better, but faster, cheaper and more accurately.

The machine selected for illustration has a rotary die roll 1 having cavities 2 for cookie dies 3. The cavities 2 and dies 3 are arranged about the roll 1 in a series of circumferential rows with the cavities 2 and dies 3 of each such row spaced annularly and with the cavities 2 and dies 3 of the respective circumferential rows aligned longitudinally of the roll 1.

A feed roll 4 having longitudinal grooves 5 in its periphery and a journal 6 rotates in the direction of the arrow 7 and contacts the die roll 1 effective for rotating the latter in the direction of the arrow 8. An oven band 9 receives the dough articles from the dies 3 and travels in the direction of the arrow 10 to an oven (not shown) wherein the formed dough articles are baked.

As shown in FIGURE 2, each die 3 has a bottom wall 11 and an outwardly extending annular side wall 12 defining a die cavity 14. The bottoms of the dies 3 are seated upon annularly spaced projections 15 on a die support 16 and the dies 3 are retained in the cavities 2 by retaining sleeves 17 having annular shoulders engaging at 55 annular shoulders on the outer surfaces of the sidewalls 12 of the dies 3. The die support 16 seats upon a member 18 having a tubular hub 19 with the axial opening 20 opening through the member 18 and through an axial opening 21 in the die support 16 to the die 3.

Tubular hub 19 is disposed in an opening 22 in the die roll 1 and a coaxial reduced diameter opening 23 opens outwardly from the open interior 24 of the roll 1 to the inner end of the opening 22. A valve shown diagrammatically at 25 is provided between the shoulder 26 at the inner end of the opening 22 and a valve plate 28 disposed between the valve 25 and the inner end of the hub 19. The valves 25 and plates 28 may be of any suitable conventional type, such as known slide valves and plates, for example, effective for covering and uncovering the adjacent ends of the openings or passages 20 and 23.

In the particular embodiment of the invention selected for illustration, the dies 3 are formed of sintered porous bronze. Sintering, as an art, is the compression of bronze or other metal powders into a die under pressures of the order of 25 tons or more. The parts are then baked to bond them tightly together.

In the formation of the dies 3 according to the present invention, the compression is reduced until the parts are porous. With approximately 5 pounds pressure of air permeating the side walls 12 and bottom wall 11 of the die 3, it is impossible to force anything to adhere to the surface of the die.

While the die cavities 14 are being loaded or filled, for example, with cookie dough from a hopper 30, air under pressure is admitted into the interior 24 of the roll 1, for example, by opening of a valve 32 in air inlet pipe 34, as shown diagrammatically in FIGURE 1. This air passes through the openings 23, past the valves 25 and valve plates 28 and permeates through the side walls 12 and bottom wall 11 of the dies 3, for example, at approximately 5 pounds pressure of air. This produces a film or blanket of air between each dough product and each die 3 which prevents adhesion or sticking of the dough product to the die. The film or blanket of air between the dough product and the die 3 prevents intimate contact between the dough and the dies.

As the roll 1 rotates in the direction of the arrow 8 to remove the dough filled dies 3 from beneath the hopper 30, a scraper 36, shown diagrammatically in FIGURE 1, acts to remove any excess dough or dough which protrudes outwardly from the die cavities 14. The dough removed from roll 1 by scraper 36 drops onto the oven band 9 from which it may be removed in any suitable manner.

When the roll 1 has rotated to position where a longitudinally aligned row of dough filled dies 3 is aligned longitudinally with the reciprocable valve stem 38 which is positioned for engagement by a stationary cam 40, as shown in FIGURE 1, the longitudinally aligned openings 23 open, for example, into a chamber 42 within a longitudinally extending member 44 fixedly supported within the roll 1. The member 44 may be carried, for example, by an inward extension of the pipe 34 and/or journals at the ends of the roll 1. The valve stems 38, one for each longitudinal row of dies 3, have reciprocating movement through the end wall 45 of the roll 1.

The member 44 is fixed so that the roll 1 rotates with respect to the member 44, which may be carried by an inward extension of the pipe 34 and/or journals at the ends of the roll. The circular extent of the member 44 is sufficient to cover the openings 23 for the dough dies 3 which are aligned longitudinally with the reciprocal valve stem 38 which is positioned for engagement by the cam 40.

When the roll 1 is positioned as shown in FIGURE 1, the cam 40 is effective, to press the registering valve stem 38 inwardly. This stem 38 presses the stem 48 of a valve shown diagrammatically at 46 in FIGURE 4 admitting air at higher pressure into the chamber 42. This air at higher pressure passes outwardly through the longitudinally aligned openings 23, around valves 25 and valve plates 28, through openings 20, and through the porous walls of the dies 3 to eject the cookies or other formed articles from the longitudinally aligned row of dies 3. The stem 48 is moved outwardly and valve 46 is closed by a spring 49 confined between a flange 50 of stem 48 and a stationary abutment (not shown), when stem 38 is released from cam 40 in the continued rotation of roll 1. The higher pressure air is admitted to the chamber 42 by the valve shown diagrammatically at 46 when this valve is opened by pressing of the stem 48.

The formed articles are extracted by forcing to them high air pressure to force the formed articles out of the die cavities 14 and directly on the oven band 9. This improves registration and uniformity. The oven band delivers the articles to an oven where they are baked.

With the present invention a softer and more desirable dough may be used and easily extracted with much less mechanism, and the pieces or articles will be produced better, faster, cheaper and more accurately.

While the dies 3 have been described as formed of sintered porous bronze, it is to be understood that within the broader aspects of the invention, the dies may be formed of any suitable metal or material that can be processed to provide within the dies a capillary pore system through which air or other fluid having no deleterious effect or influence on the dough products may be passed to prevent adhesion of the dough products to the dies and to eject the dough products from the die cavities.

It is not possible to produce the desired results with small holes drilled through the walls of the dies 3 because they must be so small as not to admit foreign material. Another problem is that when the pressure of air is increased through drilled holes it will blow the product apart.

The embodiment of the invention disclosed in the drawings and the specification is for illustrative purposes only, and it is to be expressly understood that said drawings and the specification are not to be construed as a definition of the limits or scope of the invention, reference being had to the appended claims for that purpose.

I claim:

1. A machine of the class described, comprising, a rotary die roll having an open interior and cavities arranged in a series of circumferential rows and with the cavities of the circumferential rows aligned longitudinally of the roll, dies disposed in said cavities, said dies having porous walls defining die cavities, means for introducing into said die cavities material for forming the desired articles, and means for passing a fluid under relatively low pressure from the interior of the die roll through the porous walls of the dies so as to create a film of fluid between the articles and the dies for preventing adhesion of the articles to the dies.

2. A machine of the class described, comprising, a rotary die roll having an open interior and cavities arranged in a series of circumferential rows and with the cavities of the circumferential rows aligned longitudinally of the roll, dies disposed in said cavities, said dies having porous walls defining dies cavities, means for introducing into said die cavities material for forming the desired articles, means for passing a fluid under relatively low pressure from the interior of the die roll through the porous walls of the die so as to create a film of fluid between the articles and the dies for preventing adhesion of the articles to the dies, and means for passing fluid under higher pressure through the porous walls of the dies to eject the articles from the die cavities.

3. A machine according to claim 2, wherein the passing of fluid under higher pressure through the porous walls of the dies to eject the articles from the die cavities is restricted to a longitudinally aligned row of die cavities in position in proximity to a conveying band for receiving the ejected articles and delivering same to an oven.

4. A machine of the class described, comprising, a rotary die roll having an open interior and a closed end, said roll having cavities in the periphery thereof, dies disposed in said cavities, said dies having porous walls defining die cavities, means for introducing into said die cavities material for forming the desired articles, means for passing a fluid under relatively low pressure from the interior of the die roll through the porous walls of the dies so as to create a film of fluid between the articles and the dies for preventing adhesion of the articles to the dies, a cam, a plurality of valve actuators projecting through said closed end of said die roll for actuation successively by said cam, means under control of said cam and valve actuators for passing fluid under higher pressure through the porous walls of the dies in proximity to ejecting position to eject the articles from said die cavities, and a band for receiving the ejected articles and conveying same from said die roll.

5. A machine according to claim 4, wherein there is a feed roll in proximity to the die roll, and scraper means for removing any material protruding from the die cavities.

6. A machine according to claim 4, wherein the means for introducing into the die cavities material for forming the desired articles comprises a hopper overlying the die roll.

7. A machine according to claim 4, wherein the fluid passed under relatively low pressure through the porous walls of the dies for preventing adhesion of the articles to the dies is air under a pressure of about 5 pounds.

8. A machine according to claim 4, wherein there is a chamber fixed so that the roll rotates with respect to same from which chamber fluid under higher pressure is passed through the porous walls of the dies when a longitudinally aligned row of dies is aligned with said chamber when in position for ejecting the articles from the die cavities.

References Cited by the Examiner

UNITED STATES PATENTS

| | | | |
|---|---|---|---|
| 2,478,090 | 8/49 | Devol | 65—182 X |
| 2,525,135 | 10/50 | Huff | 18—21 |
| 2,799,048 | 7/57 | Stirn | 18—21 |
| 2,877,531 | 3/59 | Heine | 25—45 |
| 2,987,767 | 6/61 | Berry | 18—57 |
| 3,136,268 | 6/64 | Gageant | 107—1.5 |

WALTER A. SCHEEL, *Primary Examiner.*

J. D. BEIN, ROBERT E. PULFREY, *Examiners.*